United States Patent [19]

Drake

[11] Patent Number: 5,105,050

[45] Date of Patent: Apr. 14, 1992

[54] ALKALI METAL BICARBONATE/ALKALI METAL CARBONATE SUPPORT, CATALYST SYSTEM, AND OLEFIN DIMERIZATION PROCESSES THEREWITH

[75] Inventor: Charles A. Drake, Nowata, Okla.

[73] Assignee: Phillips Petroleum Company, Bartlesville, Okla.

[21] Appl. No.: 735,590

[22] Filed: Jul. 25, 1991

Related U.S. Application Data

[62] Division of Ser. No. 565,540, Aug. 10, 1990.

[51] Int. Cl.$^5$ ............................................... C07C 2/24
[52] U.S. Cl. ....................................................... 585/516
[58] Field of Search ........................................ 585/516

[56] References Cited

U.S. PATENT DOCUMENTS

| | | | |
|---|---|---|---|
| 3,916,019 | 10/1975 | Closson et al. | 585/511 |
| 4,388,480 | 6/1983 | Imai et al. | 585/516 |
| 4,609,637 | 9/1986 | Drake | 502/174 |
| 4,656,154 | 4/1987 | Drake | 502/185 |
| 4,661,466 | 4/1987 | Drake et al. | 502/184 |
| 4,810,688 | 3/1989 | Ewert et al. | 502/174 |
| 4,876,410 | 10/1989 | Ewert et al. | 585/516 |
| 4,982,043 | 1/1991 | Hasselbring | 585/516 |

Primary Examiner—Asok Pal
Assistant Examiner—C. Everhart
Attorney, Agent, or Firm—Lynda S. Jolly

[57]  ABSTRACT

Catalyst supports, catalyst systems, methods for the preparation thereof, in dimerization processes therewith are provided. Catalyst supports are prepared from alkali metal bicarbonate, a liquid, and optionally alkali metal carbonate. Optionally, the catalyst support further comprises a carbonaceous compound. Catalyst systems comprise at least one elemental alkali metal deposited on the catalyst support. Optionally, the catalyst system further comprises at least one promoter.

19 Claims, No Drawings

5,105,050

ALKALI METAL BICARBONATE/ALKALI METAL CARBONATE SUPPORT, CATALYST SYSTEM, AND OLEFIN DIMERIZATION PROCESSES THEREWITH

This application is a divisional of application Ser. No. 07/565,540, filed Aug. 10, 1990, still pending.

BACKGROUND OF THE INVENTION

This invention relates to alkali metal bicarbonate supported alkali metal catalysts.

It is known in the art to employ alkali metal carbonate supported elemental alkali metal catalysts for such conversions as propylene dimerization. Several catalyst compositions, as well as methods of preparing these types of catalysts, are known in the art. The resultant catalyst systems, although useful to dimerize olefins, do not always have a high conversion rate and/or a high isomer ratio of desired product(s) to undesired product(s). Thus, a dimerization process, because of low conversion and/or low isomer ratio, can be more time consuming and require larger, more uneconomical, reactor equipment.

SUMMARY OF THE INVENTION

It is an object of this invention to provide an improved catalyst system for the dimerization of olefins.

It is another object of this invention to provide a method to prepare an improved alkali metal carbonate supported elemental alkali metal catalyst system, by the addition of alkali metal bicarbonate.

It is another object of this invention to provide a method to prepare an alkali metal bicarbonate support.

It is yet another object of this invention to provide a process to improve the isomer ratio of desired product(s) to undesired product(s) of an alkali metal bicarbonate supported elemental alkali metal catalyst system.

It is yet another object of this invention to provide an improved process for the dimerization of olefins.

In accordance with this invention, a dimerization catalyst comprising at least one elemental alkali metal supported on a support which comprises alkali metal bicarbonate, and optionally alkali metal carbonate, is provided. This dimerization catalyst is useful to dimerize olefins and results in an improved isomer ratio of desired product(s) to undesired product(s) and/or an improved olefin conversion rate.

In accordance with another embodiment of this invention, the dimerization catalyst can further comprise at least one promoter.

DESCRIPTION OF THE PREFERRED EMBODIMENTS

The present invention provides a process to prepare a catalyst support which comprises the steps of preparing a thick paste comprising alkali metal bicarbonate, a liquid, and optionally alkali metal carbonate, a carbonaceous compound, and/or finely divided stainless steel; forming a particulate product from said paste; and calcining said particulate product. The particulate product can be formed by grinding and sieving prior to calcining, or it can be formed into an extrudate, pellets, tablets, pills, and/or any other granular form prior to calcining. After calcination, the particulate product is contacted with at least one elemental alkali metal, and optionally a promoter, to produce a catalyst composition.

SUPPORTS

The catalyst support can be formed by any method known in the art. Thus, commercially available alkali metal bicarbonate and alkali metal carbonate in the form of powder, pellets, granules, or any other form can be treated directly with at least one elemental alkali metal and, optionally, one or more of the desired promoting materials as discussed more fully below. This form of support has the advantage of being most readily obtained with a minimum of handling.

The final support composition can be entirely alkali metal bicarbonate or it can be a mixture of alkali metal bicarbonate and alkali metal carbonate. The amount of alkali metal bicarbonate and alkali metal carbonate in the mixed composition support generally comprises a range from about 5 parts to about 0.5 parts by weight of alkali metal bicarbonate mixed with about 0.5 parts to about 5 parts by weight of alkali metal carbonate in the final support. Preferably, the support comprises about 2 parts to about 0.5 parts by weight of alkali metal bicarbonate mixed with about 0.5 parts to about 2 parts by weight of alkali metal carbonate in the final support. The most preferred composition is a range of from about 1.5 to 0.5 parts by weight of alkali metal bicarbonate to about 0.5 to 1.5 parts by weight of alkali metal carbonate in the final support to provide a catalyst system with improved conversion and/or improved isomer ratio.

The amount of alkali metal bicarbonate and alkali metal carbonate in the mixed composition support can also be expressed in terms of weight percent. Generally the mixed composition support comprises alkali metal bicarbonate within a range of from about 90 to about 10 weight percent and about 10 to about 90 weight percent of alkali metal carbonate based on weight of the final support. Preferably, the support comprises from about 80 to about 20 weight percent of alkali metal bicarbonate mixed with about 20 to about 80 weight percent of alkali metal carbonate by weight in the final support. The most preferred composition is from about 75 to about 25 weight percent of alkali metal bicarbonate mixed with about 25 to about 75 weight percent alkali metal carbonate by weight in the final support.

Exemplary alkali metal bicarbonates include bicarbonates of lithium, sodium, potassium, rubidium, cesium, and mixtures thereof. Potassium bicarbonate is the most preferred alkali metal bicarbonate due to ease of use and good compatibility with the preferred elemental alkali metal. Exemplary alkali metal carbonates include carbonates of lithium, sodium, potassium, rubidium, cesium, and mixtures thereof. Potassium carbonate is the most preferred alkali metal carbonate due to ease of use and good compatibility with the preferred elemental alkali metal. The bicarbonate and carbonate can contain the same or a different alkali metal. As stated earlier, bicarbonates and carbonates of potassium are the preferred support materials for compatibility reasons. The preferred alkali metal is potassium due to its ready availability as well as excellent compatibility with the inventive catalyst support.

In some circumstances, a large particle size and/or more rugged form of catalyst support is desired, such as, for example, where fixed bed reactions, especially large volume fixed bed reactions, are carried out. One particular technique for support preparation is to form a thick paste comprising alkali metal bicarbonate, a liquid and optionally alkali metal carbonate. In most cases the liquid can be water; or mixtures of water and alcohols; or water and water soluble ketones. The thick paste can be extruded, pelletized, pilled, or tabletted into desired sizes. The resultant material is then oven dried under conditions of time and temperature sufficient to remove substantially all liquid. These types of supports will be referred to as "wet process" alkali metal carbonate supports.

The wet process using alcohol and water as liquid is disclosed in Ewert et al, U.S. Pat. No. 4,810,688, herein incorporated by reference. Alcohols suitable for use in preparation of "wet process" catalyst supports are straight chain and branched aliphatic alcohols having from about 1 to about 7 carbon atoms. The wet process using water soluble ketone and water is disclosed in Drake U.S. Pat. No. 4,895,819, herein incorporated by reference. Water soluble ketones suitable for use in preparation of "wet process" catalyst supports are straight chain and branched water soluble ketones having from about 3 to about 7 carbon atoms.

In accordance with another technique for the support preparation, an alkali metal bicarbonate and optionally an alkali metal carbonate, are pelletized with at least one carbonaceous compound. The pelleted support, either as pellets or as smaller crushed particles, is then heated in an oxygen-containing atmosphere under conditions suitable to oxidize in the range of about 10 to about 90 weight percent of the carbonaceous compound. As a result of this partial oxidation of the pelleted support, the concentration of carbonaceous compound remaining on the surface of the support is substantially less than the concentration of carbonaceous compound remaining on the interior portions of the support. Catalyst support prepared in this manner will be referred to as "carbon containing" alkali metal carbonate support.

The term "carbonaceous compound" is intended to include various forms of the elemental carbon. Examples include, but are not limited to, carbon black, charcoal, coconut charcoal, amorphous graphite, and crystallite graphite.

Once the catalyst support is formed, according to any method known in the art, the support must be calcined in an oxygen-containing atmosphere at a temperature within the range of about 100° to about 400° C., preferably from about 150° to about 375° C., and most preferably from about 175° to about 350° C. for a time of at least 2 hours. The temperature needs to be high enough to drive off water from the surface and the pores of the support. If the temperature is too high, the support can melt and eliminate all porosity resulting in low activity catalyst. Times in excess of about 20 hours generally impart no additional beneficial affect. Thus, times in the range of about 2 to about 20 hours are useful. Upon completion of calcination, the catalyst support can be stored in a dry atmosphere. Preferably, the catalyst support is stored under a dry, oxygen-free atmosphere until needed for further treatment.

CATALYSTS AND PROMOTERS

Catalyst systems employed in the practice of this invention comprise one of the catalyst supports described above, at least one elemental alkali metal catalyst, and optionally one or more of the following additional promoters:
elemental copper,
elemental cobalt,
finely divided stainless steel,
finely divided glass, and
mixtures of two or more thereof.

It should be recognized, however, that the catalyst systems of the invention can contain additional components which do not adversely affect the catalyst performance, such as, for example, pigments, dyes, processing aids, inert fillers, binders and the like.

The alkali metals contemplated to be within the scope of the invention include lithium, sodium, potassium, rubidium, and cesium. While the proportion of alkali metal combined with the catalyst support can vary appreciably, generally at least about one weight percent of alkali metal based on the total weight of treated support will be employed. Generally, about 1 to about 20 weight percent alkali metal will be employed with about 2 to about 15 weight percent preferred. An alkali metal loading of about 3 to about 10 weight percent based on the total weight of treated support is most preferred for most efficient use of reagents, high catalyst activity and selectivity, high isomer ratio, and ease of catalyst preparation. Potassium is the most preferred elemental alkali metal due to its ready availability as well as excellent compatibility with the inventive catalyst support.

The proportion of optional promoter on the alkali metal bicarbonate support can vary appreciably, but generally, at least one weight percent of the optional promoter based on the total weight of final calcined support will be employed. The following amounts are provided for additional guidance:

| Promoter | Loading: Weight Percent | | |
|---|---|---|---|
| | Broad | Intermediate | Preferred |
| Cu | 1-30 | 3-20 | 5-12 |
| Co | 1-50 | 3-25 | 5-15 |
| *SS | 1-80 | 3-60 | 5-50 |
| Glass | 1-50 | 2-25 | 3-15 |

*SS = Stainless Steel

The general procedure for preparation of the catalyst systems of the invention, after calcining the support, involves heating the catalyst support to a temperature in the range of about 80° to about 350° C., preferably slightly above the melting point of the particular alkali metal used, cooling the particulate support and then contacting the particulate support with at least one elemental alkali metal in a dry, oxygen-free atmosphere, such as, for example $N_2$, Ar, or the like, at a temperature sufficient to cause the alkali metal to melt. The contacting, done in an oxygen-free atmosphere, is preferably carried out with suitable mixing to ensure even distribution. Suitable temperatures for the contacting step will vary with the particular alkali metal employed. For example, with elemental potassium, temperature in the range of about 80° to 100° C. are preferred, while with elemental sodium, temperatures in the range of about 100° to 140° C. are preferred.

While the catalyst support is maintained at or above the melting point of the particular alkali metal used, in an oxygen-free atmosphere, any desired promoter(s), such as, for example, finely divided stainless steel or elemental copper, can be gradually added while the treated catalyst is continually stirred. For example, with potassium, temperatures in the range of about 80° to about 100° C. are employed. The catalyst system is then ready to be charged to the reactor.

Optionally, the catalyst support, once elemental alkali metal and any desired promoters have been deposited thereon, can be subjected to a subsequent heating step, in an oxygen-free atmosphere, to ensure as uniform a distribution as possible of the various promoters on the surface of the alkali metal bicarbonate support. Thus, the finished catalyst can be subjected to a temperature in the range of at least about 80° C. for a time in the range of about 0.1 to about 4 hours. A temperature in the range of about 150° to about 250° C. for a time in the range of about 0.5 to about 2 hours is presently preferred for the most uniform distribution.

Optionally, prior to charging the reactor, the catalyst system can be mixed with an inert substance to dilute the catalyst system and decrease the rate of olefin dimerization. Any inert substance which has no catalytic activity in an olefin dimerization reaction can be used. One example of such an inert substance is glass beads.

As indicated by the variety of supports, alkali metal components, and promoters included within the scope of the invention, numerous catalyst combinations are possible. Any combination of the alkali metal and optional promoters disclosed can be supported on any alkali metal bicarbonate support disclosed. Some possible combinations are described in detail in the examples which follow. The combination of support, alkali metal and promoter(s) which one may choose to employ will depend on a variety of variables such as for example, reactor configuration, reaction temperature and pressure, olefin feed employed, rate of olefin feed, and conversions desired.

REACTANTS

Reactants applicable for use in the process of the invention are olefinic compounds which can (a) self-react, i.e., dimerize, to give useful products such as, for example, the self-reaction of propylene gives 4-methyl-1-pentene; and/or (b) olefinic compounds which can react with other olefinic compounds, i.e., co-dimerize, to give useful products such as, for example, co-dimerization of ethylene plus propylene gives 1-pentene, co-dimerization of ethylene and 1-butene gives 3-methyl-1-pentene and so forth. As used herein, the term "dimerization" is intended to include both self-reaction and "co-dimerization" as defined above.

Suitable dimerizable olefinic compounds are those compounds having from about 3 to about 30 carbon atoms and having at least one olefinic double bond and at least one allylic hydrogen atom, i.e., at least one hydrogen atom attached to a carbon atom adjacent to a double-bonded carbon atom. Exemplary compounds include, but are not limited to, acyclic and cyclic olefins such as, for example, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes and so forth; 3-methyl-1-butene, 2-methyl-2-butene, 3-methyl-1-pentene, 3-methyl-2-pentene, 4-methyl-1-pentene, 4-methyl-2-pentene, tetramethylethylene and the like; cyclopentene, cyclohexene, methylcyclopentene, methylcyclohexene, and the like and mixtures of any two or more thereof.

Suitable co-dimerizable olefinic compounds are those compounds having from about 2 to about 30 carbon atoms, including all the compounds contemplated within the scope of "dimerizable" olefinic compounds as indicated above. In addition, olefinic compounds which do not have at least one allylic hydrogen atom are also included within the scope of co-dimerizable olefins. Exemplary compounds in addition to those indicated above, include, but are not limited to ethylene, 3,3-dimethyl-1-butene, ditertiarybutyl ethylene and the like and mixtures of any two or more thereof.

The compounds indicated above as dimerizable olefinic compounds are capable of undergoing both self-reaction, i.e., dimerization, and cross-reaction, i.e., co-dimerization, with other members of the same group or with those compounds designated as co-dimerizable. The co-dimerizable compounds which do not have at least one allylic hydrogen may be capable of isomerization to form an olefin having an allylic hydrogen under the reaction conditions employed. If such isomerization is not possible, then those non-isomerizable, co-dimerizable compounds which do not have at least one allylic hydrogen must be contacted with at least one of the "dimerizable" compounds in order to facilitate the desired co-dimerization reaction. In other words, the co-dimerizable compounds which do not have at least one allylic hydrogen atom and are not capable of isomerization to produce an olefin having at least one allylic hydrogen are therefore not capable of reacting with themselves under the reaction conditions employed for the dimerization reaction.

REACTION CONDITIONS

The dimerization reaction of the invention can be carried out using either batch or continuous types of operation, although the catalysts of the invention are particularly well suited for continuous, fixed bed, operation. Suitable equipment, such as, for example, autoclaves, tubular reactors and the like as are well known in the art can be employed. No special materials of construction are required so that steel, stainless steel, glass-lined reactors, or the like can be employed.

The reaction temperature can vary depending on the catalyst and feed(s) employed. Typically, a temperature range of about 50° to about 250° C. is suitable. Temperatures of about 80° to about 200° C. are preferred with a range of about 120° to about 170° C. most preferred because optimum reaction rates are obtained with minimum by-product formation.

The dimerization reaction can be carried out by contacting the dimerizable olefins with catalyst in the liquid phase or the gas phase, depending on the structure and molecular weight of the olefin, as well as reaction temperature and pressure employed. Pressure during the dimerization reaction can vary between wide limits. In general, higher pressures favor the progress of the reaction. Thus, pressures of atmospheric up to about 10,000 psig and higher are suitable. Preferably, pressures of about 100 to about 5,000 psig are employed, with pressures of about 1,000 to about 4,000 psig most preferred in order to achieve a good balance between reaction rate and minimize equipment and operating costs necessitated by very high reaction pressures.

If the reaction is carried out in the liquid phase, solvents or diluents for the reactants can be used. Saturated aliphatic hydrocarbons, e.g., pentane, hexane, cyclohexane, dodecane; aromatic compounds, preferably those without an alpha-hydrogen (which would be capable of undergoing alkylation under the reaction conditions) such as benzene and chlorobenzene are suitable. If the reaction is carried out in the gaseous phase, diluents such as aliphatic hydrocarbons, for example methane, ethane and/or substantially inert gases, e.g., nitrogen, argon, can be present.

The contact time required for the dimerization reaction depends upon several factors, such as, for example, the activity of the catalyst, temperature, pressure, structure of the reactants employed, level of conversion desired, and the like. The length of time during which the dimerizable olefinic compounds are contacted with catalyst can vary conveniently between about 0.1 seconds and about 24 hours although shorter and longer contact times can be employed. Preferably, times of about one minute to about 5 hours are employed. Where reaction is carried out in continuous fashion, it is convenient to express the reactant/catalyst contact time in terms of weight hourly space velocity (WHSV), i.e., the ratio of the weight of reactant which comes in contact with a given weight of catalyst per unit time. Thus, a WHSV of about 0.1 to about 10 will be employed. A WHSV of about 0.5 to about 5 is preferred, with about 1 to about 4 WHSV most preferred for optimum catalyst productivity.

PRODUCTS

The olefinic products of the invention have established utility in a wide variety of applications, such as, for example, as monomers for use in the preparation of homopolymers, copolymers, terpolymers, e.g., as the third component of ethylene-propylene terpolymers useful as synthetic elastomers, and the like.

A further understanding of the present invention and its advantages will be provided by reference to the following examples.

EXAMPLES

In each of the following examples, typically, the dimerization of propylene was carried out in a steam heated 316 stainless steel tubular reactor ($\frac{1}{2}"\times 20"$). The catalyst system (27 grams; density about 0.84 g/mL), bounded above and below by small volumes of glass beads, was combined with 25 grams of an inert substance, i.e., no dimerization catalytic activity, to dilute the catalyst system and thus reduce and control the reaction rate. The contents of the tubular reactor were heated to the reaction temperature of about 160° C. at about 1500 psig and propylene was pumped into the reactor at a rate of about 120 mL/hr. After about 1.5 hours of reaction time and each one hour thereafter for the following 6 hours, a sample was collected and analyzed by gas liquid chromatograph (GLC). The summarized results represent the analysis of the last dimerization sample collected.

Catalyst supports were prepared from commercially available anhydrous potassium bicarbonate (JT Baker, ACS reagent grade), commercially available anhydrous potassium carbonate (JT Baker, ACS reagent grade), and mixtures thereof. A catalyst support was prepared from potassium carbonate and deionized water (Run 1). A catalyst support was also prepared from one part of potassium bicarbonate, one part potassium carbonate, and deionized water (Run 2). Two other catalyst supports were prepared from potassium bicarbonate and deionized water (Runs 3 & 4).

The solid components had a particle size of equal to or less than about 0.42 mm (40 mesh). Sufficient water was added to the solid particles to form a thick paste. Usually, about 2 milliliters of water were added to about 1 gram of solid material. The thick paste was thoroughly mixed and then dried at about 85° C. in a vacuum oven for at least two hours in the presence of air. The dried paste was ground to about six mesh and calcined at about 250° C. for about 3 hours in an oxygen-containing atmosphere.

The resultant support was allowed to cool and maintained at a temperature of about 85° C. in an oxygen-free atmosphere, at which time about 5 to about 8 weight percent of elemental potassium based on the weight of total support was added while mixing. In addition an amount of inert material, equal to the amount of original, calcined support, was mixed with the elemental potassium and the catalyst support. The catalyst support and catalyst system were kept under a dry, inert atmosphere at all times during and after preparation.

Catalyst and the results of the corresponding propylene dimerizations are summarized in Table 1. Percent propylene conversion is the weight percent of reactant propylene that was converted to any type of reaction product. Percent selectivity is the weight percent of product that was converted to 4-methyl-1-pentene (4MP1). The isomer ratio, 4-methyl-1-pentene/4-methyl-2-pentene (4MP1/4MP2), is the mass ratio of 4MP1 to 4MP2 in the final product. The isomer ratio data is significant because 4MP1, the desired product, and 4MP2, the undesired product, are difficult to separate.

TABLE I

| Run No. | Support | Catalyst* | Conversion, % | Selectivity, % | 4MP1/4MP2 |
|---|---|---|---|---|---|
| 1 | $K_2CO_3$ | 5% K | 21.9 | 88.0 | 19 |
| 2 | 1:1 $KHCO_3$:$K_2CO_3$ | 5% K | 24.6 | 88.0 | 20 |
| 3 | $KHCO_3$ | 5% K | 10.1 | 89.4 | 38 |
| 4 | $KHCO_3$ | 8% K | 21.2 | 89.5 | 28 |

*% by weight, based on weight of catalyst support

The data in Table I show that the best overall propylene dimerization catalyst is that in Run 4, based on a combination of high levels of percent conversion, selectivity and isomer ratio, although other formulations are effective propylene dimerization catalysts. Run 1, where $KHCO_3$ is absent from the catalyst support, demonstrates lower isomer ratio and lower selectivity. When equal mass ratios of $K_2CO_3$ and $KHCO_3$ are used, as in Run 2, the percent conversion and isomer ratio are improved over Run 1, where $KHCO_3$ is absent from the catalyst support.

This example has been provided merely to illustrate the practice of the invention and should not be read so as to limit the scope of the invention or the appended claims in any way. Reasonable variations and modifications, not departing from the essence and spirit of the invention, are contemplated to be within the scope of patent protection desired and sought.

That which is claimed is:

1. The dimerization process comprising contacting olefins under dimerization conditions with a composition comprising:
   a) at least one elemental alkali metal; and
   b) a support comprising an alkali metal bicarbonate wherein component (a) is supported on component (b).

2. A process according to claim 1 wherein said olefin contacting is carried out at a temperature within the range of about 80° to about 200° C., a pressure within the range of about 1000 to about 4000 psig, and a weight hourly space velocity within the range of about 0.1 to about 10.

3. A process according to claim 1 wherein said olefin has from about 3 to about 30 carbon atoms per molecule.

4. A process according to claim 3 wherein said olefin is propylene.

5. A process according to claim 1 wherein said elemental alkali metal is potassium.

6. A process according to claim 1 wherein said elemental alkali metal is present in an amount within the range of from about 1 to about 20 weight percent, based on the total weight of said support.

7. A process according to claim 1 wherein said alkali metal bicarbonate is potassium bicarbonate.

8. A dimerization process comprising contacting olefins under dimerization conditions with a composition comprising:
   a) at least one elemental alkali metal; and
   b) a support comprising alkali metal bicarbonate and alkali metal carbonate;
   wherein component (a) is supported on component (b).

9. A process according to claim 8 wherein said olefin contacting is carried out at a temperature within the range of about 80° to about 200° C., a pressure within the range of about 1000 to about 4000 psig, and a weight hourly space velocity within the range of about 0.1 to about 10.

10. A process according to claim 8 wherein said olefin has from about 3 to about 30 carbon atoms per molecule.

11. A process according to claim 10 wherein said olefin is propylene.

12. A process according to claim 8 wherein said elemental alkali metal is potassium.

13. A process according to claim 12 wherein said elemental alkali metal is present in an amount within a range of from about 1 to about 20 weight percent, based on the total weight of said support.

14. A process according to claim 8 wherein said alkali metal bicarbonate is potassium bicarbonate and wherein said alkali metal carbonate is potassium carbonate.

15. A process according to claim 8 wherein said support comprises alkali metal bicarbonate within a range of from about 90 to about 10 weight percent and alkali metal carbonate within a range of from about 10 to about 90 weight percent, both based on total weight of the support.

16. A process for the production of 4-methyl-1-pentene comprising contacting propylene under dimerization conditions with a catalyst system comprising:
   a) elemental potassium; and
   b) a support comprising potassium bicarbonate
   wherein said elemental potassium is supported on said potassium bicarbonate.

17. A process according to claim 16 wherein said propylene contacting is carried out at a temperature within a range of about 80° to about 200° C., a pressure within a range of about 1000 to about 4000 psig, and a weight hourly space velocity within a range of about 0.1 to about 10.

18. A process for the production of 4-methyl-1-pentene comprising contacting propylene under dimerization conditions with a catalyst system composition comprising:
   a) elemental potassium; and
   b) a support comprising potassium bicarbonate and potassium carbonate;
   wherein said elemental potassium is supported on said support.

19. A process according to claim 18 wherein said propylene contacting is carried at a temperature within a range of about 80° to about 200° C., a pressure within a range of about 1000 to about 4000 psig, and a weight hourly space velocity within a range of about 0.1 to about 10.

* * * * *